(12) United States Patent
Wendte et al.

(10) Patent No.: US 9,516,815 B2
(45) Date of Patent: *Dec. 13, 2016

(54) HARVESTER AND METHOD USING AN RFID SYSTEM FOR DETECTING AND LOCATING OBJECTS AND CONDITIONS ALONG A HARVESTING PATH

(71) Applicant: CNH America LLC, New Holland, PA (US)

(72) Inventors: Keith W. Wendte, Willowbrook, IL (US); Bingcheng Ni, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 529 days.

This patent is subject to a terminal disclaimer.

(21) Appl. No.: 13/786,671

(22) Filed: Mar. 6, 2013

(65) Prior Publication Data

US 2014/0250854 A1  Sep. 11, 2014

(51) Int. Cl.
*A01D 46/28* (2006.01)
*A01D 34/00* (2006.01)
*A01D 46/26* (2006.01)

(52) U.S. Cl.
CPC ............. *A01D 46/28* (2013.01); *A01D 34/008* (2013.01); *A01D 46/26* (2013.01)

(58) Field of Classification Search
USPC .......................................................... 701/50
See application file for complete search history.

(56) References Cited

U.S. PATENT DOCUMENTS

| | | | |
|---|---|---|---|
| 4,236,371 A | 12/1980 | Claxton | |
| 5,307,611 A | 5/1994 | Vardeman et al. | |
| 5,819,859 A | 10/1998 | Stump et al. | |
| 6,854,254 B2* | 2/2005 | Merant | 56/330 |
| 7,002,461 B2 | 2/2006 | Duncan et al. | |
| 7,543,436 B2 | 6/2009 | Scott et al. | |
| 7,748,206 B1* | 7/2010 | Posselius et al. | 56/328.1 |
| 7,757,471 B2 | 7/2010 | Mayo | |
| 7,818,953 B2 | 10/2010 | Pellenc et al. | |
| 2009/0229177 A1* | 9/2009 | Hyde et al. | 47/1.7 |
| 2011/0238270 A1* | 9/2011 | David Beaulieu | 701/50 |
| 2012/0010789 A1* | 1/2012 | Dulnigg | 701/50 |

FOREIGN PATENT DOCUMENTS

FR        2554672 A1    5/1985

* cited by examiner

*Primary Examiner* — Alicia Torres
(74) *Attorney, Agent, or Firm* — Rebecca L. Henkel (57) ABSTRACT

A harvester for agricultural products such as fruits such as grapes, berries, vegetables, and the like, and method of harvesting, using an RFID system capable of detecting and interrogating RFID tags associated with objects or conditions along a path of the harvester in a manner to determine both presence and location of the associated object or condition, to enable responsively adapting or altering the operation of harvesting apparatus in a predetermined manner, such as by reducing or interrupting forces exerted thereby when about or proximate the object or condition.

20 Claims, 7 Drawing Sheets

HARVESTER AND METHOD USING AN RFID SYSTEM FOR DETECTING AND LOCATING OBJECTS AND CONDITIONS ALONG A HARVESTING PATH

TECHNICAL FIELD

The present invention relates to a harvester for agricultural products such as fruits such as grapes, berries and the like, and vegetables, and a method of harvesting, which utilizes an RFID system capable of detecting and interrogating RFID tags associated with objects or conditions along a path of the harvester in a manner to determine both presence and location of the associated object and/or condition, to enable responsively changing or altering the operation of harvesting apparatus of the harvester in a predetermined manner, such as by reducing or interrupting forces exerted thereby when about or proximate the object or condition to reduce possible damage or other undesired results.

BACKGROUND ART

It is well known to harvest agricultural products, such as, but not limited to, fruit, such as grapes, and berries such as blackcurrants, gooseberries or raspberries, olives and coffee beans, and vegetables, using an automatic harvester, which can be self-propelled or tractor driven. Reference in regard to modern self-propelled harvesting machines, Mérant U.S. Pat. No. 6,854,254, issued Feb. 15, 2005 to CNH France S.A., and entitled Harvesting Device With Disengageable Shaker Members For A Fruit Harvesting Machine; and Posselius et al. U.S. Pat. No. 7,748,206 issued Jul. 10, 2010 to CNH America LLC and entitled Fruit Harvester With System and Method for Detecting and Reducing Forces Exerted Against Rigid Standing Objects.

Fruit harvesters, particularly for grapes, such as the harvester disclosed in the above-identified Mérant and Posselius et al. patents, typically utilize harvesting apparatus configured to exert forces against the plants or vines bearing the fruit, in this example, by shaking them using a generally horizontal sinusoidal or pseudo-sinusoidal movement of a selected amplitude and frequency selected for detaching the fruit or the bunches of the fruit. This forceable movement is typically communicated to the whole of the vine or plant by movable shaker members disposed to operate either on the stocks or the stems of the vines or on the vegetation, i.e. on the fruit-bearing area of the vine or plant, depending on the type and number of shaker members used. As an example, the percentage of the bunches of grapes and/or individual grapes that are detached from the vine is typically a function of the number and amplitude of the oscillations to which a given bunch of grapes is subjected. The more vigorously a given bunch of grapes is shaken, and the greater the number of times it is shaken, the greater the chance of the bunch or its individual grapes being detached from the vine. The number and the amplitude of the oscillations to which a given bunch of grapes is subjected depend on various parameters for which suitable values can be selected, in particular the amplitude and the frequency of the output of the drive mechanism associated with the shaker members, the length of the active area of said shaker members, their stiffness or flexibility, and the rate at which the machine moves forward, and on other factors that are imposed by the vine itself, in particular how it is trained, its shape and the resistance that it has to the movement of the shaker members. The shaker members can be compiled in assemblies supported in face-to-face relation on opposite sides of a straddling frame defining an elongate passage therethrough.

In operation, the straddling frame is driven in straddling relation along a row of trees, vines or other plants carrying the fruit or vegetables to be harvested, which pass through the passage. As this occurs, the shaker assemblies are oscillated by their drive mechanism in a cooperative manner, with sufficient forcefulness to correspondingly flex while in contact with the plants, to detach the grapes, berries, vegetables, or other agricultural products. The detached products then fall into baskets of conveyors below the shaker assemblies.

A problem that has been encountered when harvesting agricultural products using an automated harvester such as described above, is that in many instances the rows of plants include upstanding rigid, unyielding objects which are likewise contacted by the shaker members of the harvesting apparatus. Such rigid upstanding objects can include, for instance, reinforced concrete and metal posts. In particular, vines bearing grapes are often supported on trellises or wires supported by upstanding posts, poles or pipes of hard, unyielding material such as reinforced concrete containing metal wires and/or bars, at spaced intervals along the rows. The forces generated by such shaking or vibratory contact with such rigid unyielding objects, in combination with the effects of a rough surface texture thereof, e.g., weathered concrete, pitted metal, and the shape, of the objects, e.g., angular such as rectangular or octagonal, over time, results in damage to, and/or excessive wear of, the harvesting apparatus, particularly the shaker members, as well as possible damage to the rigid objects. Such contacts can also result in undesirable noise, and vibration which can be transmitted to the operator platform or cabin of the harvester.

The Posselius et al. patent provides a manner of detecting some standing rigid objects, and adapting or altering the operation of the harvesting apparatus for passage about the standing object in a manner to reduce or minimize forces exerted thereagainst. The normal operation of the harvesting apparatus is then automatically resumed after passage, as a function of speed and distance from the detected object. This capability is satisfactory for many applications, but may not be ideal for applications wherein there are other items present that may be falsely or undesirably detected, such as vines, branches, etc., having similar detection characteristics to posts; wherein trellis wires and the like may include large splices, turnbuckles, and the like, guy wires may be present, and/or wherein the posts may otherwise lack discernable features facilitating detection.

There is also a need for a detection capability for objects and conditions having poor metallic properties, poor magnetic properties, etc., and for instances wherein it is desired to alter the harvesting operation at a related or associated location or condition not exactly coincident with, or larger than, the detectable object. Representative conditions wherein it may be desired to not harvest include regions of plants of different maturity (not yet ripe or overripe), damage or low quality, insect or other pest infestation, disease, or the like.

Thus, what is sought is a manner for providing one or more of the desired capabilities, while overcoming one or more of the problems and/or shortcomings, set forth above.

SUMMARY OF THE INVENTION

Thus, what is disclosed is a harvester for agricultural products and a method of harvesting, which utilizes an RFID system for providing one or more of the desired capabilities, namely, detecting objects and/or conditions in contact with or proximity to it is desired to reduce movements or forces exerted by the harvesting apparatus, while overcoming one or more of the problems and/or shortcomings, set forth above.

According to a preferred aspect of the invention, the harvester includes a movable frame and harvesting apparatus connected thereto for movement therewith along agricultural products bearing plants, the harvesting apparatus including at least one movable member, and a drive controllably operable and configured to drivingly move the at least one member in a predetermined manner for exerting forces against the plants for releasing at least some of the products therefrom. The harvester includes an RFID system including at least one device, e.g., a commercially available RFID reader or transceiver, carried on or in connection with the frame in predetermined relation to the at least one movable member, configured to automatically detect or read a predetermined identifying signal emitted by an RFID tag present within a predetermined RFID tag detecting range of the at least one device in a manner to determine presence and location of an object or condition associated with the RFID tag relative to the at least one movable member of the harvesting apparatus. The RFID system is connected with a controller operatively connected to the drive and configured to automatically operate responsive to the determined presence and location of the object or condition associated with the tag, to control the drive to cause a responsive action, which is preferably a change in the movement of the at least one member when positioned to contact the object or condition. The RFID system and controller can be separate and connected via a suitable communications path, or be incorporated one into the other or integrated, as desired or required for a particular application.

According to another preferred aspect of the invention, the device or devices of the RFID system can be of a well known, commercially available construction and operation, and comprises a transceiver including an antenna for detecting and receiving the signals from an RFID tag or tags located in the RFID tag detecting range about or proximate to the device, and circuitry to interrogate the signal for validating presence and identity of the RFID tag, and optionally reading additional information contained in the signal, and responsively outputting a signal or command indicating the presence of the RFID tag to the controller and elsewhere, as well as the information read from the tag, if any.

As another preferred aspect, the RFID system will also have a capability to generate and output an electromagnetic field within the limited RFID tag detecting range, e.g., utilizing or more inductive coils operable for energizing an RFID tag directly or via backscatter, only when located within the range. The preferred range is relatively small, on the order of about 25 cm or so, to limit energizing and undesired detecting or reading nearby RFID tags, such as on an adjacent plant row or path, or at a close location along the same row or path. The system can also utilize a single antenna or multiple antennas, for instance on opposite sides of the harvester, and/or in a fore and aft or vertical array or arrays, as desired or required for providing desired detection and interrogation characteristics.

As another preferred aspect of the invention, the device or devices of the RFID system will be located at the front of the harvester, and optionally on the rear. As a result, the system can be capable of detecting RFID tags when the harvester is moving forwardly and also rearwardly, and the rear located device or devices if provided can be used to determine passage of the object or condition from the harvester when moving forwardly for resuming normal operation of the harvesting apparatus, and also when the harvester in moving rearwardly.

As another preferred aspect of the invention, the resulting change in the movement of the at least one member is to decrease or reduce forces exerted thereby, which can be accomplished in a number of ways, such as but not limited to, disengaging or slipping a clutch connecting the drive to the member, idling or halting operation of the drive, and the like. The movement is preferably changed for a period of time sufficient only for passage of a portion of the at least one member beyond the object or condition, to satisfactorily reduce or eliminate potential damage to or from the object, and not harvest the products related to the condition, associated with the detected RFID tag, as desired or required for a particular application.

According to another preferred aspect of the invention, at least two characteristics of the emitted identifying signal are used to determine when the movable member or members of the harvesting apparatus will be located coincident or proximate the RFID tag, e.g., in position to contact and possibly damage, or be damaged by, an associated object, or located to harvest products in a region of the path of the associated condition. Numerous characteristics can be used for this purpose.

As one non-limiting example, the characteristics can include initial detection of the RFID tag signal, indicative of entry of the tag into the RFID tag detecting range, and loss of the signal, indicative of departure or passage from the range. The time of each detection will also be known and is preferably recorded or "time stamped". Because bounds of the RFID tag detecting range, the times of detection of the characteristics, and spatial relationship between the detecting device or devices and the subject member or members of the harvesting apparatus are all known, the time at which the subject RFID tag will reach the movable member or members of the harvesting apparatus is determined by calculation, and initiation of the responsive change in the movement will be implemented at that time. Since the physical parameters of the subject member or members, e.g., length or extent in the distance of travel, are also known, the duration of the responsive change in movement can be determined by estimation or calculation. In both instances, harvester ground speed, if known, e.g., from a speed sensor output, can also be used if desired. As a variant, if the movable member or members of the harvesting apparatus is/are located directly or closely rearward of the RFID tag detecting range, or the responsive action is otherwise required substantially immediately after detection, the initiation of responsive action can occur directly upon or at a fixed time after detection. It is thus possible that just one characteristic, e.g., initial detection or loss of signal, can be used in some instances for triggering the change in movement of the member or members of the harvesting apparatus.

Other exemplary characteristics that can be used include two or more strength values of the emitted signal. The strength values can be the same or different, and will preferably be selected as indicative of moving toward the RFID tag, and moving away, e.g., an initial or threshold strength less than the maximum anticipated signal strength.

As another non-limiting example, the signal strength can be continuously monitored, e.g. a new value compared to a previous highest value, for determining whether the signal strength is increasing or declining, so that the peak value representing the closest location of the emitting RFID tag to the associated receiving device of the RFID system is determined.

As another option, the emitted RFID signal can contain information that can be obtained from interrogation, which can include for instance, information as to the extent, e.g., time and/or distance that the harvesting operation is to be altered or interrupted. As a non-limiting example, for an object such as a single post, the time may be relatively brief and/or distance relatively short, whereas for a condition such as downed or damaged plants, the time and/or distance may be relatively long. As another contemplated variant, the information contained in the signal may include location information for the associated object or condition if not immediately adjacent to the RFID tag. Still further, the RFID tag can include information relating to plants associated therewith, e.g., variety, condition, maturity, etc. As another advantage of using RFID tags according to the invention, the tags can be used for interrupting harvesting temporarily, for instance, until a field or row has been harvested, or in association with immature or damaged fruit or other products, and the contained information can be changed as desired or required using a conventional device for writing to an RFID tag.

According to a preferred method of operation as the harvesting machine moves about a row of product bearing plants and encounters an RFID tag, the RFID tag will either already be energized, or will be energized by entering the RFID detecting range, to output its signal, prior to the movement of the harvesting apparatus about the associated object or condition. The signal will be interrogated to determine the presence of the associated object or condition, and the operation of the harvesting apparatus will be altered accordingly.

As still another aspect of the invention, for an object or condition of a larger extent, such as several plants in a row, more than one RFID tag can be used, such as at both ends of the condition.

According to another preferred aspect of the invention, the RFID tags can be permanently or temporarily attached to an associated object or plant, in any desired and convenient manner such as using a fastener or fasteners, e.g., a screw or nail, a wire tie, hook, adhesive, or the like.

DETAILED DESCRIPTION OF THE INVENTION

Figure 1:
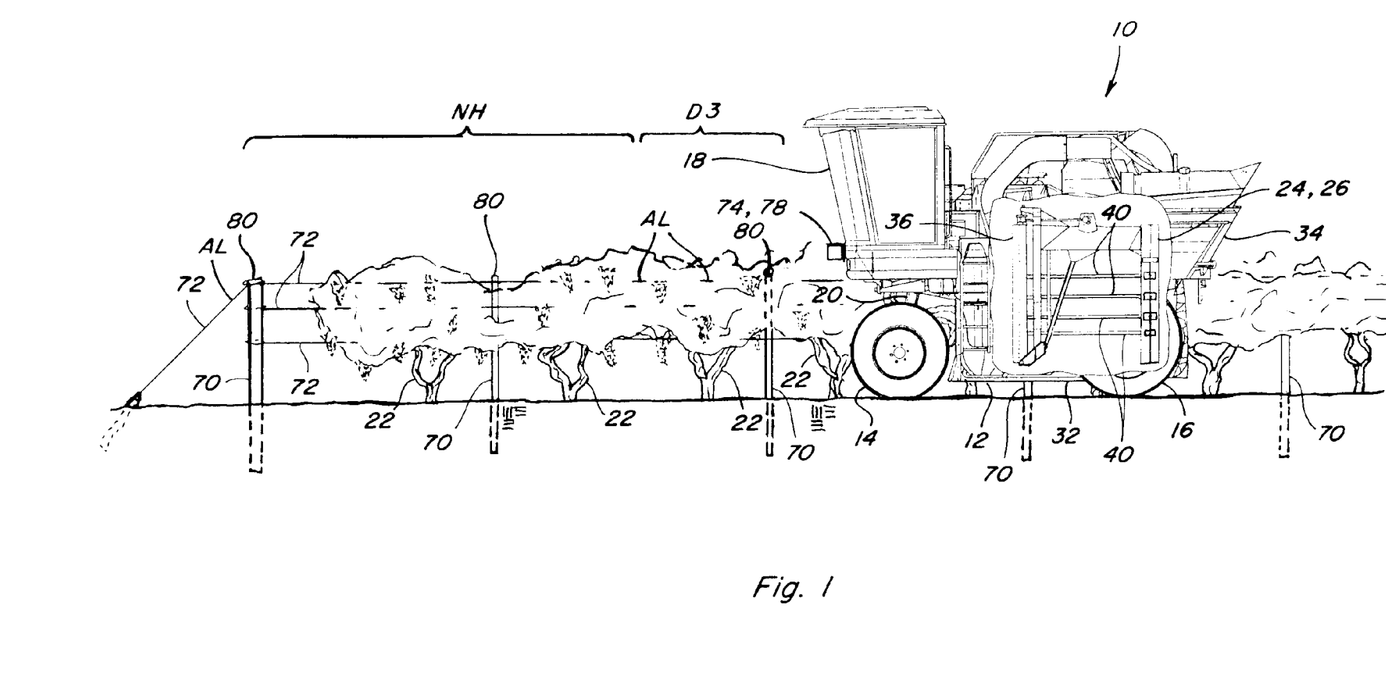
FIG. 1 is a side view, partly cut away, showing a harvester incorporating an RFID system for detecting objects and conditions along a path of the harvester for responsively altering or changing a manner of operation of harvesting apparatus, shown in an operating mode moving along a trellis supporting a row of products bearing plants, supported by spaced posts including RFID tags.
Figure 2:
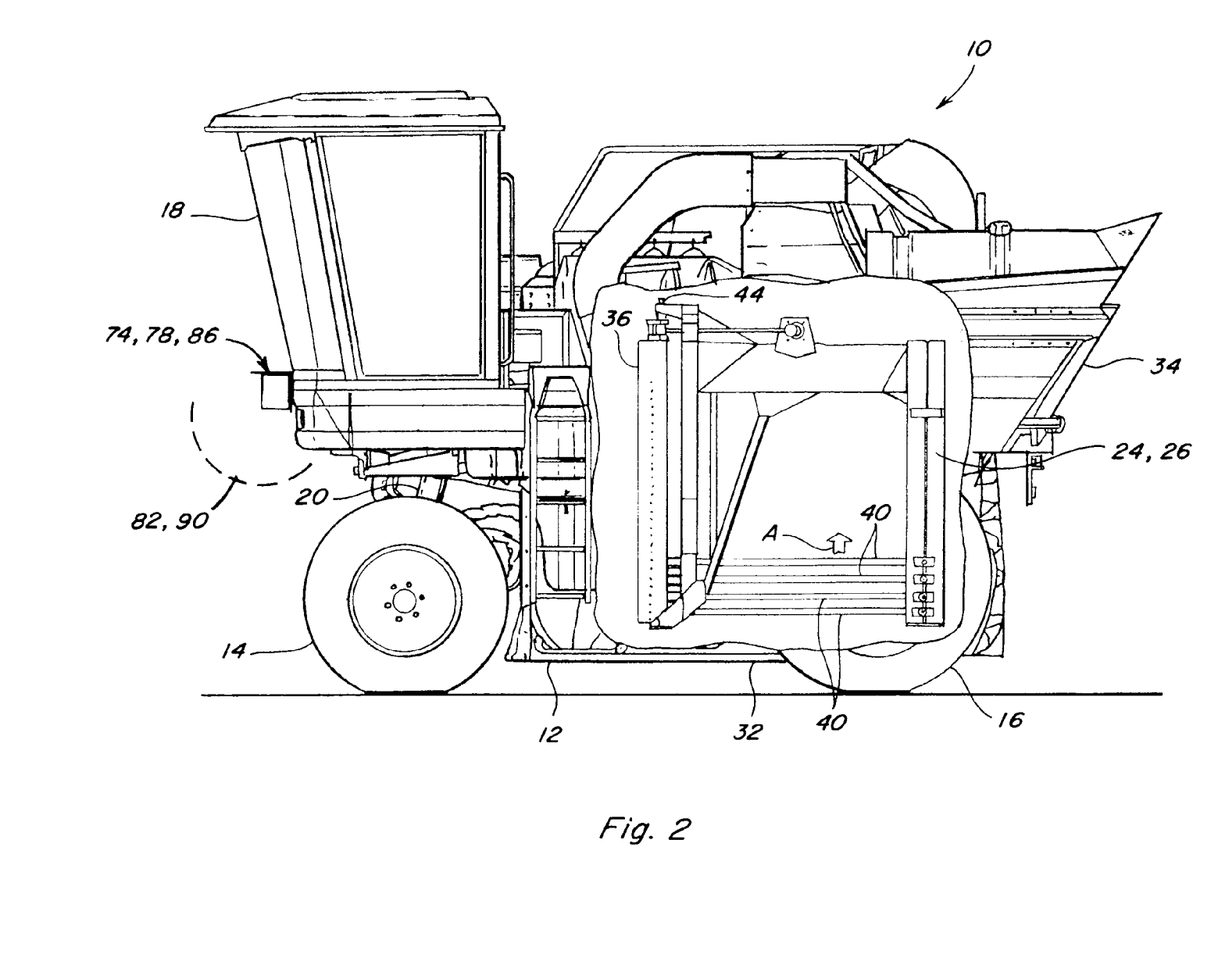
FIG. 2 is an enlarged side view of the harvester of FIG. 1.

Referring now to the drawings, in FIGS. 1 and 2, a representative fruit harvester 10, as more particularly described and illustrated in Mérant U.S. Pat. No. 6,854,254, hereby incorporated herein in its entirety by reference, is shown. Generally, harvester 10 has a gantry type straddling frame 12 supported by fore and aft wheels 14 and 16, for movement over a surface, such as the ground. Harvester 10 is illustrated as a self-propelled machine, having an engine which provides motive power to wheels 14 and/or 16, for example, via pressurized fluid delivery to hydraulic motors (not shown) in connection with the wheels. As an alternative, harvester 10 could be provided with tracks, or comprise a towed vehicle, as desired or required for a particular application.

Harvester 10 includes an operator cabin 18, and can also be configured for raising and lowering frame 12 relative to wheels 14 and 16, via articulating legs 20, or other suitable structure connecting frame 12 to wheels 14 and 16, such that frame 12 can stay level during movement over laterally sloped surfaces, and for adjusting the height of straddling frame 12 above the ground.

Straddling frame 12 is of well known construction, and is configured for traveling along a path while straddling at least one row of products bearing plants, for example, a row of grape vines, several rows of vines, represented in FIG. 1 by vines 22, for example, or two or three rows of vines if harvester 10 is used in close-planted vineyards. Straddling frame 12 carries or supports harvesting apparatus 24 configured and automatically operable for detaching grapes or bunches of grapes from the vines 22, as is known in the art.

Figure 3:
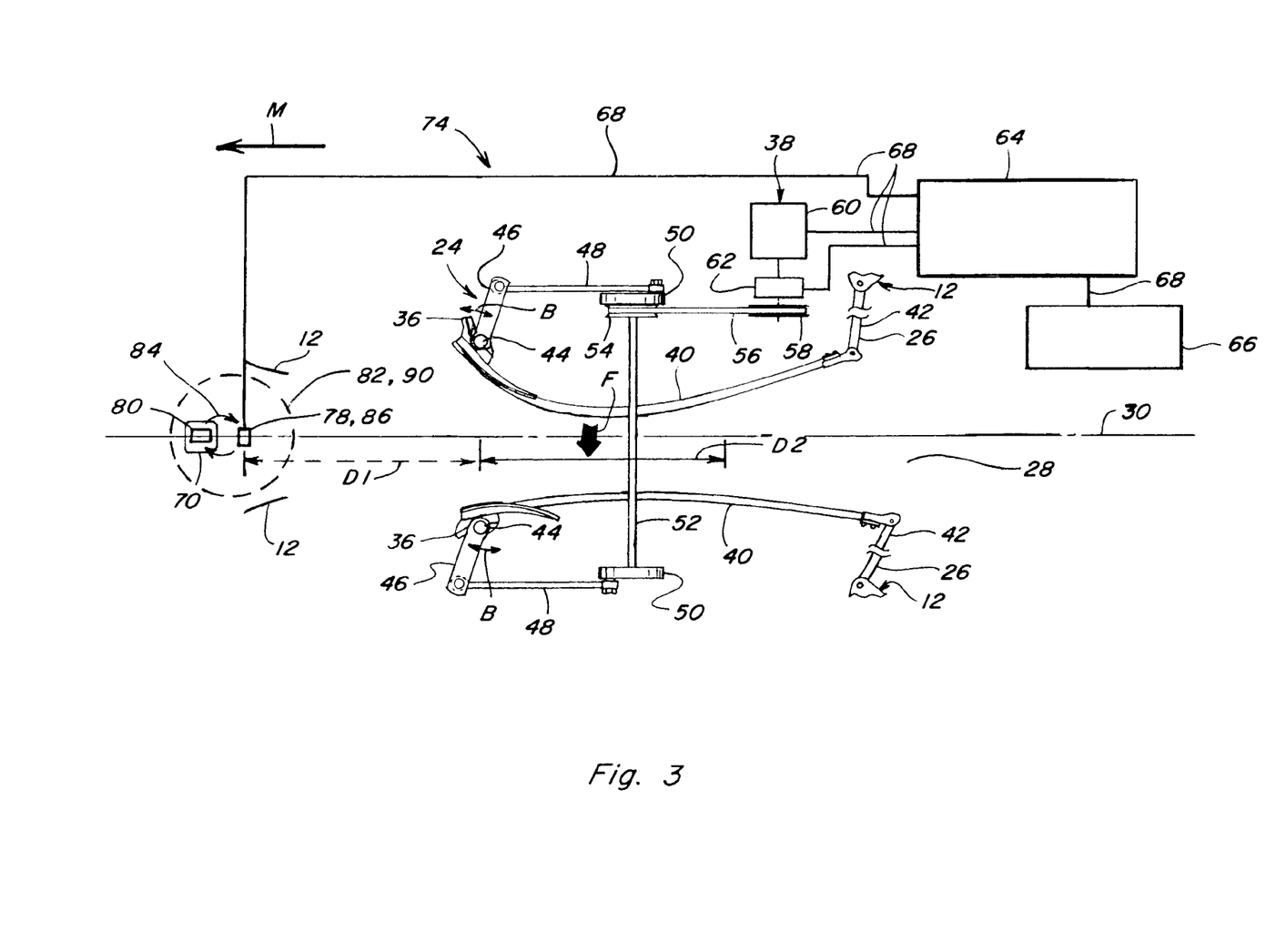
FIG. 3 is a simplified schematic representation of aspects of the harvesting apparatus and system of the invention, showing entry of a representative post including an RFID tag into an RFID detecting range of the system.
Figure 4:
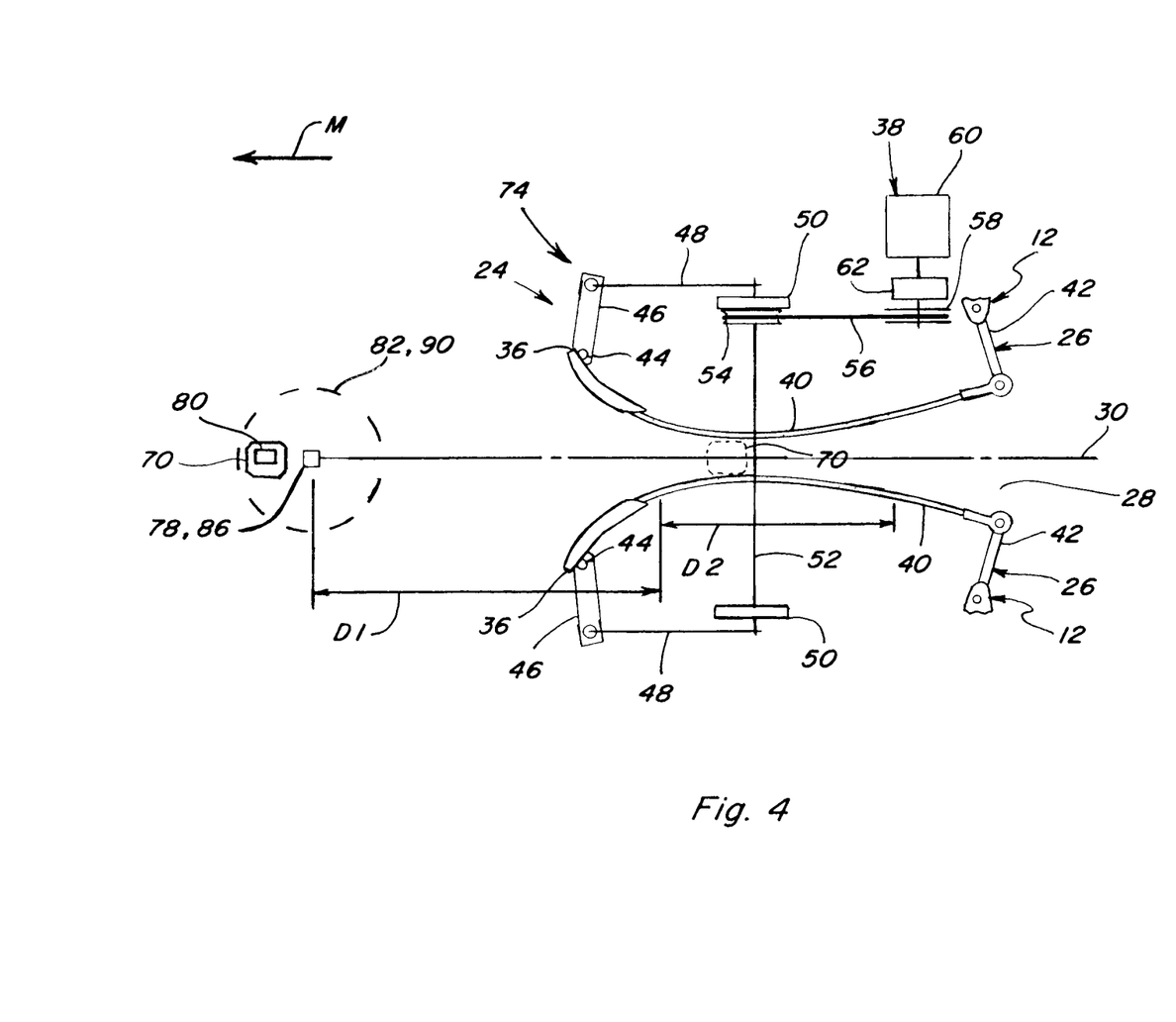
FIG. 4 is another simplified schematic representation of aspects of the system of the invention, showing the harvesting apparatus configured in a mode for passage about the post while reducing forces exerted thereagainst.

Referring also to FIGS. 3 and 4, harvesting apparatus 24 includes two shaker assemblies 26 disposed on opposite sides, respectively, of a passage 28 through frame 12, defining a path between assemblies 26 and through frame 12, as denoted by a centerline 30. Shaker assemblies 26 are configured and operable, as will be explained, for exerting forces, denoted generally by arrow F in FIG. 3, against the products, here, grapes, of plants such as vines 22 (FIG. 1), located in passage 28, so as to detach the products and cause them to fall from the vines.

In the instance of grapes, the grapes can be detached by this forceable movement in bunches and/or individually. The detached products will fall into receptacles of a conveyor 32 (FIGS. 1 and 2) of known construction and operation disposed adjacent to the bottom of the respective shaker assemblies 26 beside passage 28, and be carried to a hopper or hoppers 34 disposed on a rear portion of harvester 10. As is known in the art, and explained in detail in U.S. Pat. No. 6,854,254, to generate the oscillating movements, each of the two shaker assemblies 26 includes an oscillating vertical plate 36 which, in operation, oscillates about a vertical axis of a vertical shaft 44 of the assembly to which it is affixed, under control of a drive 38. A plurality of shaker members 40 are, in turn, adjustably connected to each vertical plate 36, so as to be individually positionable at vertical positions therealong as most advantageous for the harvesting operation, as illustrated by arrow A in FIG. 2 and the positions of member 40 as shown in FIG. 1.

Here, each shaker member 40 preferably consists of a rod having a small cross section compared to its length and made from a flexible material such as a glass fiber-reinforced polyester resin or a polyamide, for example. For a grape harvesting application such as illustrated, rods having a circular section of approximately 30 mm diameter and a length of approximately 1.8 m, made from a polyamide, can be used. As is known in the art, each shaker member 40 can be solid or hollow (tubular), or it can have a composite structure with a core having the required flexibility characteristics covered with a wear resistant material different from the material of the core. In a relaxed or substantially unflexed state, each member 40 is substantially rectilinear. When each member is mounted in the harvesting apparatus 24, it extends horizontally lengthwise and curves or flexes into an arcuate shape, the convex side of which is oriented toward centerline 30, and the degree of flexure of which is controllable or settable. The front end of each member 40 is detachably coupled to one of the two oscillating vertical plates 36, and the rear end of each member 40 is connected to frame 12 or structure of the shaker assembly 26 by suitable structure, here, a link 42, such that oscillations of the respective plates 36 will result in alternating forceful flexure (top member 40 in FIG. 3) for exerting force F, and relaxation (bottom member 40).

Shaft 44 of each shaker assembly 26 is preferably supported so as to be rotatable about a longitudinal vertical axis therethrough which, as noted above, coincides with the vertical axis of oscillation of the oscillating vertical plate 36. Plate 36 and shaft 44 of each assembly 26 are connected for joint movement, such that back and forth rotation of shaft 44 about its vertical axis will effect the oscillating movement of plate 36. To accomplish this, each shaft 44 is rigidly fixed to a radial drive arm 46 of drive 38 so as to be rotatable in a back and forth manner thereby, as denoted by arrows B in FIG. 3. Drive 38 includes a crank arm 48 having one end pivotally connected to drive arm 46, and an opposite end rotatably connected by a pin to a cam 50 of the drive. The two cams 50 are joined for joint, timed rotation by a cross shaft 52 of the drive, such that plates 36 on the opposite sides of passage 28 will be oscillated in a phased relation, which here is preferably of about 180 degrees, by the rotation of cams 50, as illustrated by the different positions of members 40 in FIG. 3 (upper member 40 at about its greatest extent of flexure, lower member 40 at about its minimum extent of flexure or relaxed state).

The timed, phased relationship of plates 36 results in alternating timed, forced flexure and relaxation of shaker members 40 on the opposite sides of passage 28, in a manner such that as shaker members 40 on one side of passage 28 are at about their maximum state of flexure so as to project their greatest extent toward centerline 30, shaker members 40 on the other side are at about their maximum state of relaxation so as to be at their greatest distance from the centerline. To drive shaker members 40 in the above manner, drive 38 includes a sprocket or pulley 54 fixed to cross shaft 52, and which is connected by a transmission chain or belt 56 to another sprocket or pulley 58, connected in rotatably driven relation to a motive device 60 of drive 38, which can be, for example a hydraulic motor, electric motor, or a driveline to the engine of the harvester 10. A clutch 62 is shown disposed between motive device 60 and pulley 58, and is conventionally constructed and operable so as to be controllably operable in an engaged state for connecting device 60 in rotatably driving relation to pulley 58, and in a disengaged state for disconnecting device 60 and pulley 58. Clutch 62 can additionally optionally be operable in a partially engaged state to allow slipping between device 60 and pulley 58, if desired or required for a particular application.

It will typically be desired to operate shaker members 40 of harvesting apparatus 24 at a speed which corresponds to the speed of movement of harvester 10 in relation to the plants being harvested, with the objective of exerting sufficient forces F against the plants being harvested, e.g., vines 22 in FIG. 1, for effectively detaching and collecting the products with efficiency, yet minimal damage. To accomplish this, the speed of operation of motive device 60 will typically be controlled as a function of the speed of movement (as denoted by arrows M in FIGS. 3 and 4) of the harvester. Referring more particularly to FIG. 3, this can be accomplished in any suitable desired manner, such as, but not limited to, using a processor based controller 64, in connection with a speed device 66, which can be for instance, a conventional element of the drivetrain operable for sensing or determining a speed of movement thereof, e.g., one or more of wheels 14, 16, or a driveshaft (not shown), or a conventional device operable for determining the speed of harvester 10 relative to the ground, and outputting signals representative thereof to controller 64. This can be, for instance, in a closed loop system wherein harvesting apparatus 24 is controlled as a function of one or more parameters, e.g., ground speed of harvester 10. Motive device 60, clutch 58 and speed device 66 can be connected to controller 64 by suitable conductive paths 68, such as wires of a wiring harness of harvester 10, a wired or wireless controller area network, or the like, for receiving power and/or command signals therefrom, and outputting signals thereto. It should be noted that harvester 10 is intended to be representative of a wide variety of harvesters with which the present invention can be used, and thus the invention is not limited for use with harvester 10.

As noted above, and as illustrated in FIG. 1, particularly when harvesting grapes, upstanding rigid or essentially non-yielding objects may be dispersed along the path of movement of harvester 10, in this instance, posts 70, which support wires 72 that carry vines 22, so as to be necessarily straddled by frame 12 and harvesting apparatus 24, during the movement, and such that posts 70 may be forceably contacted by shaker members 40. Some posts 70 are potentially damaging to shaker members 40, e.g., have abrasive weathered, pitted, and/or damaged surfaces, rough and/or damaged edges, etc., which can roughen, scratch or otherwise damage and wear the surfaces of members 40, which if so damaged, can also damage vines 22 and fruit carried thereby, which is obviously undesirable in most instances. Harvesting apparatus 24 can also damage the rigid objects. Damage to shaker members 40 has been found to be particularly problematic when the rigid objects are reinforced concrete posts, that is, those containing metal reinforcing wires or rods, and when shaker members 40 are repeated forceably reciprocatingly moved or oscillated thereagainst. Alternatively or additionally, it may be desired to not harvest a particular section of plants, as denoted by section NH in FIG. 1, for a variety of conditions or reasons, such as, but not limited to, poor quality, immaturity, blight, infestation, etc., as explained elsewhere herein.

Figure 7:
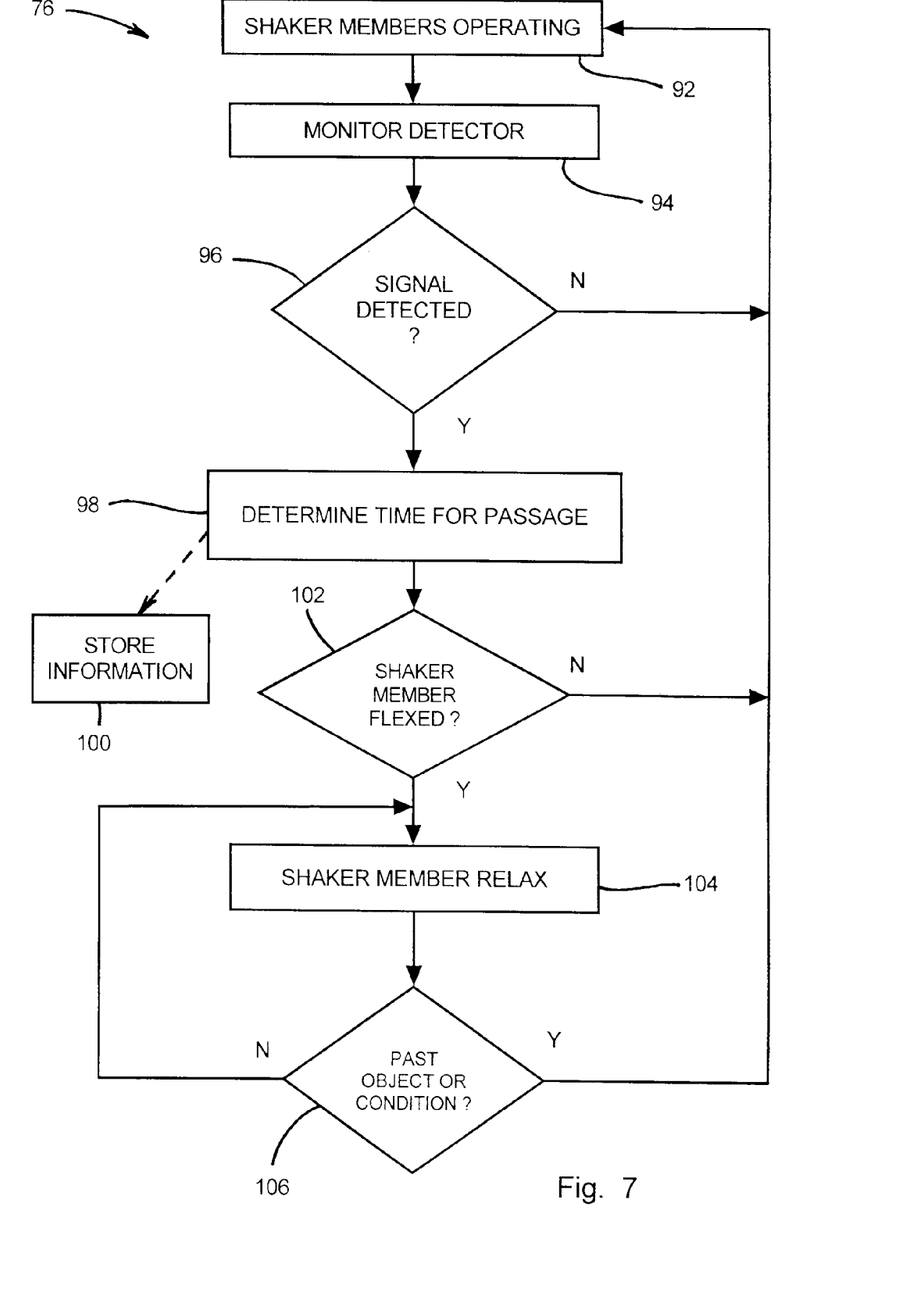
FIG. 7 is a high level flow diagram showing steps of a representative method of operation of the RFID system according to the invention.

Referring in particular to FIGS. 3 and 4, and also to FIG. 7, to overcome or significantly reduce the above problem, harvester 10 includes an RFID system 74 configured and operable according to a preferred method 76 of the invention, for detecting RFID tags along a path of movement of harvester 10, associated with objects or conditions, such as, but not limited to, posts 70, section NH, etc., and reducing the forces exerted by harvesting apparatus 24, particularly, shaker members 40, thereagainst, while preferably minimizing any resultant disruption of the harvesting operation or reduction in yield. System 74 preferably utilizes at least one device 78 which is preferably a commercially available RFID reader or transceiver, carried on or in connection with frame 12 in predetermined relation to harvesting apparatus 24, and particularly, shaker members 40 thereof. Each device 78 is configured to automatically detect or read a predetermined identifying signal 84 emitted by an RFID tag 80 within a predetermined RFID tag detecting range 82 of the device 78, to determine presence and location of an object or condition associated with the RFID tag 80 relative to the shaker member or members 40 of the harvesting apparatus. RFID system 74 is connected to controller 64 via a suitable conductive path 68, and controller 64 is programmed and configured to automatically operate responsive to the determined presence and location of the object or condition associated with an RFID tag 80, to control drive 38 to cause a responsive action, which is preferably a change in the movement of the shaker members 40, for reducing forces exerted against the object or condition associated with the detected RFID tag, here, post 70.

Each device 78 of RFID system 74 can be of a well known, commercially available construction and general operation, and preferably comprises a transceiver or antenna for detecting and receiving the signal or signals 84 from an RFID tag or tags 80 located in RFID tag detecting range 82 about or proximate to the device 78.

System 74 includes an RFID interrogator 86, also preferably of well known, commercially available construction and general operation, connected to device or devices 78 and controller 64 via suitable conductive paths 68, and including circuitry to receive and interrogate the signal or signals 84 for validating presence and identity of the RFID tag 80, and optionally read additional information contained in signal or signals 84 if present. Interrogator 86 is further operable to responsively output a signal or command indicating the presence of the detected RFID tag or tags 80 to controller 64, as well as the information read from the tag, if any. Additionally, the information read can be stored in an optional memory 88 connected to system 74 e.g., to interrogator 86, or controller 64, via a suitable conductive path 68, so as to be retrievable for desired purposes such as data keeping, signal timing computations, or the like.

The preferred device or devices 78 is an RFID transceiver of commercially available construction capable of receiving signals 84 and also including inductive circuitry for generating and outputting an electromagnetic field 90 at least encompassing pertinent portions of range 82, operable to energize an RFID tag or tags 80 located within range 82 for outputting signal or signals 84. This is advantageous as it allows use of passive type RFID tags that only emit signals 84 when externally energized, instead of active tags that carry a power supply and emit signals continuously and are more expensive and require internal power, e.g. a battery, although it should be recognized and understood that active RFID tags can be used according to the invention.

An RFID tag 80 for use with the invention will typically include a chip that contains a power extraction circuit (charge pump) to draw energy from the environment, e.g., electromagnetic or magnetic field generated by a device 78 to power the chip; a modulator/demodulator to communicate with device 78; logic and memory components that keep data and execute instructions, e.g., outputs signal 84; and an antenna for emitting signals 84 to a device or devices 78.

The RFID detecting range 82 is preferably relatively small, as a non-limiting example, on an order of 25 centimeters or so in relation to receiving device 78, e.g., radially therefrom, so that there is reduced chance of detection of nearby RFID tags, on for instance, an adjacent row or path, or down the row or path of movement of harvester 10.

Figure 5:
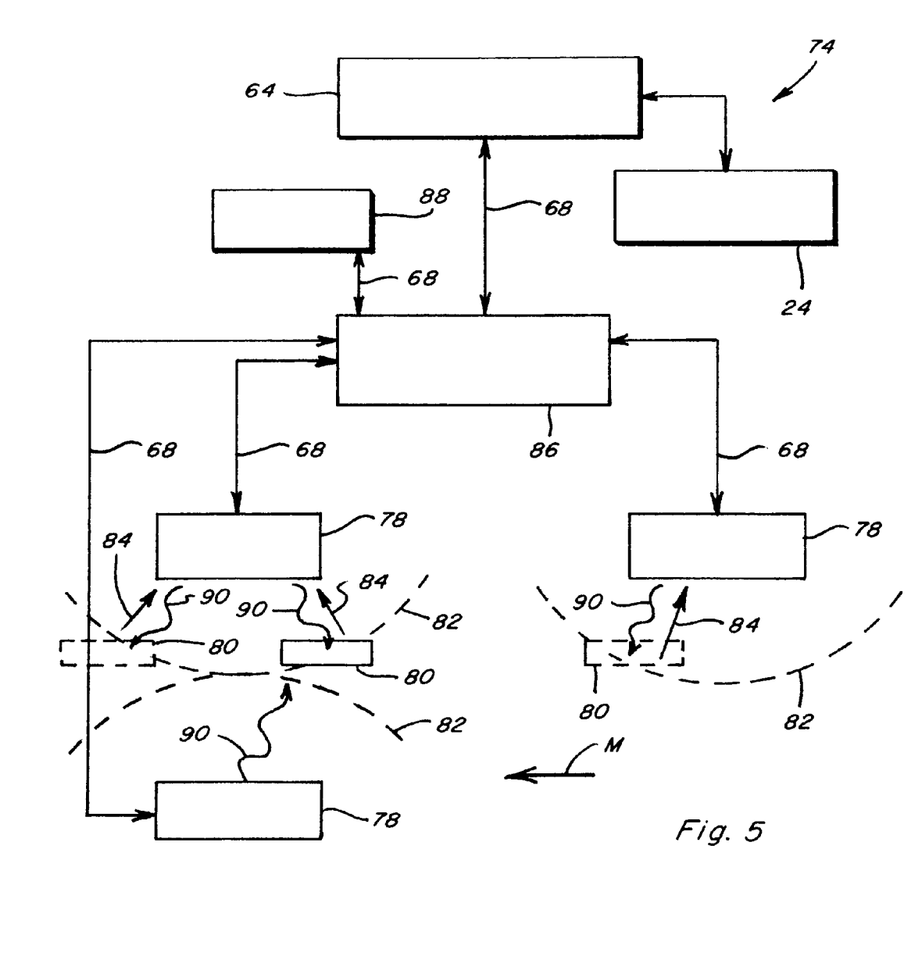
FIG. 5 is a simplified schematic diagram of the RFID system of the invention, showing a representative RFID tag entering and departing the RFID tag detecting range of a forward device of the system, and entering the range of an optional rear device.
Figure 6:
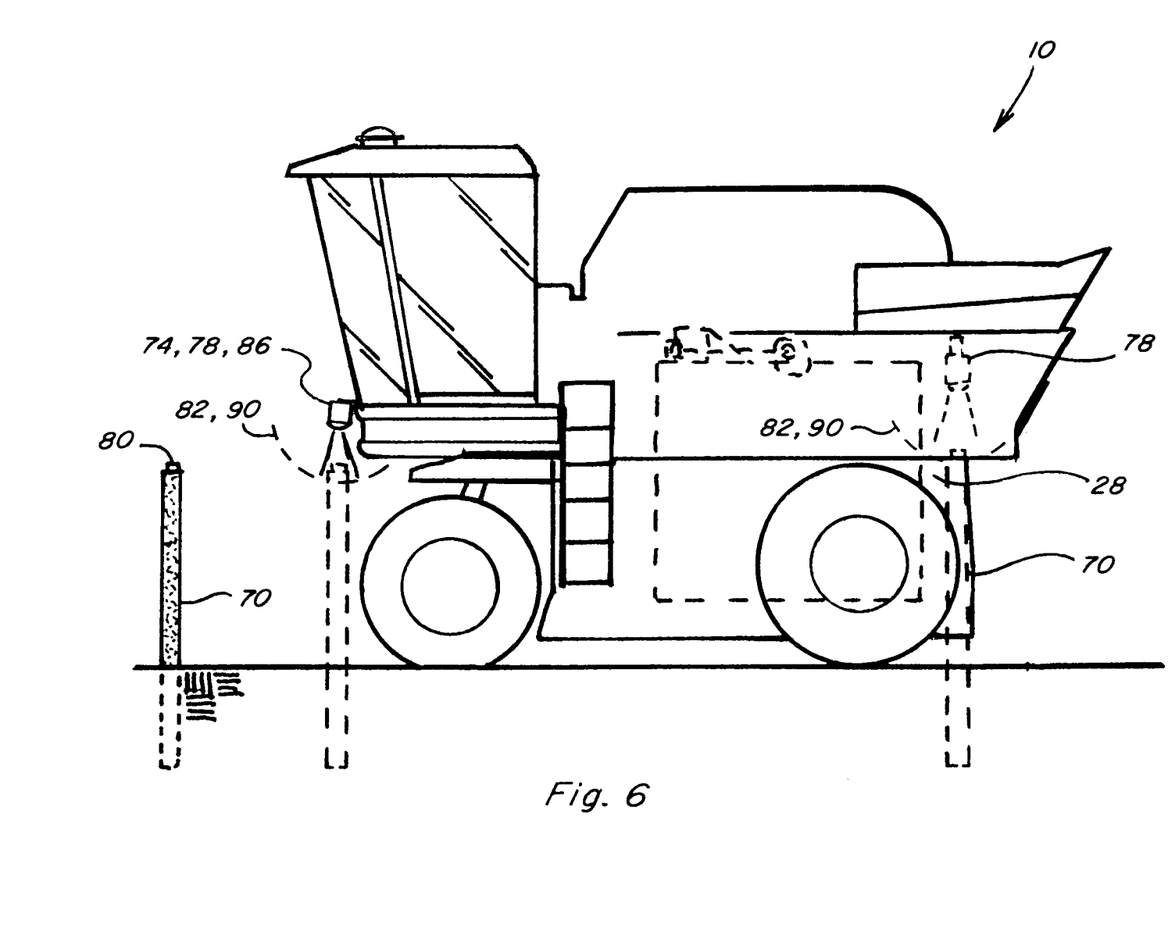
FIG. 6 is a simplified side view of the harvester, showing an optional device of the system on the rear end.

Referring particularly to FIG. 5 and also to FIG. 6, in regard to the number of devices 78, it is contemplated that a system 74 of the invention will have at least one device 78 on a forward end of harvester 10, e.g., on frame 12 at or just below the level of floor of cabin 18 adjacent to an inlet of passage 28, so as to pass in close proximity to the tops of posts 70. Additional devices 78 can be used as desired or required for a particular application, such as one or more additional devices 78 on the forward end in a vertical, and/or horizontal or diagonal pattern or array, side to side and/or fore and aft, to provide desired detection characteristics for a particular application, e.g., so as to be capable of interaction with RFID tags located on plants or lower on posts, etc. It is also contemplated to provide a rear located device or devices 78, e.g., in or by a rear opening of passage 28, as desired or required for a particular application, as illustrated in FIGS. 5 and 6, for detecting passage of tags 80 as they pass from the harvester, and also for detecting tags if the harvester is moving rearward. Further in this regard, a device 78 and associated interrogator 86 can be incorporated into a single housing or unit, or can be separate, as desired or required for providing desired detection and interrogation characteristics.

Further in this regard, for the illustrated products, e.g., grapes carried on vines supported on trellises in turn supported on posts 70, it can be observed that the RFID tags 80 are located on or adjacent the tops of posts 70, so as to be less exposed to contact with the harvesting apparatus, but can be located elsewhere, such as attached to a trellis or guy wire or a plant, as illustrated by the various alternative locations AL in FIG. 1, using suitable attachments such as wires, straps, fasteners, or the like. It should thus be understood in this regard that because the RFID detecting range is relatively small, the tags will be located so as to be within range of and detectable from the location or locations device or devices 78 on a particular harvester.

Referring also to FIG. 7, a high level flow diagram showing steps of a preferred method of the invention is shown. At block, 92, shaker members 40 are operating in the normal harvesting mode, and harvester 10 is moving along a row of products bearing plants, e.g., grapes. At block 94, RFID system 74 is operating, with device or devices 78 generating electromagnetic field 90 within RFID tag detecting range 82. At decision block 96, interrogator 86 and/or controller 64 determines if a signal 84 has been detected. If no, controller 64 will loop back to block 92. If yes, a time for passage is determined, as denoted by block 98.

Time for passage of the object or condition associated with a particular RFID tag can be a general determination made for all detected tags, or can be customized for a particular tag or category of tags. There may also be one or more such categories. As an example of a general determination, each device 78 is a known distance from shaker members 40 of harvesting apparatus 24, represented by distance D1 to the forward end of members 40. So a determination as to when to initiate responsive action can be made automatically by controller 64 as a function of the time for harvester 10 to travel distance D1, for instance, as a function of speed data from speed device 66. If desired, once initiated, the responsive action can be implemented by controller 64 automatically for a predetermined period of time, e.g., estimated time for passage of the object or condition, or a second calculation can be made using a value D2 which represents an effective length of a contact region of members 40, deemed most potentially damaging and/or subject to damage from forceful contact. As additional factors, referring more particularly to FIG. 1, the known length of a section not to be harvested, e.g., the length of section NH, and distance of the section from an associated RFID tag, e.g., distance D3 from post 70 and associated RFID tag 80 closest to the front end of harvester 10, can be used for determining the timing and duration of the time of passage.

As a variant, if the movable member or members of the harvesting apparatus is/are located directly or closely reward of the RFID tag detecting range, so that distance D1 is essentially zero or close to zero, or the responsive action is otherwise required substantially immediately after detection of a tag 80, the initiation of responsive action can occur directly upon or at a fixed time after detection.

In more complex timing determinations, one or more conditions can be monitored for more precisely locating the detected RFID tag 80. Exemplary conditions include, but are not limited to, initial detection of signal 84, or loss of the signal. In this regard, it can be observed that the edges of range 82 is relatively precisely known, and that the initial detection and also the loss of signal can be correlated to distance D1, as either an addition or subtraction therefrom, respectively. A selected signal strength value can be used similarly, e.g., a certain value or maximum value, and the time of appearance of the value can be time stamped internally by interrogator 86 or controller 64 for calculating timing of initial contact with the member or members 40.

Other exemplary characteristics that can be used include two or more strength values of signal 84. The strength values can be the same or different, and will preferably be selected as indicative of moving toward the RFID tag, as illustrated by the leftmost position of RFID tag 80 shown in range 82 of the left upper device 78 in FIG. 5; and moving away, as illustrated by the rightmost position of tag 80 in relation to the upper left device 78, and the occurrence of the values will be time stamped, so that the location of the RFID tag or maximum signal value in relation to device 78 can be determined or estimated more precisely. For example, a time when the RFID tag is substantially coincident with detecting device 78 can be determined or estimated as a middle value between the two time stamps.

As another non-limiting example, the strength of signal 84 can be continuously monitored, e.g. a new value compared to a previous highest value, for determining whether the signal strength is increasing or decreasing, so that the peak value representing the closest location of the emitting RFID tag 80 to the detecting device 78 can be determined.

With all of the above examples, once the time of passage of the detecting device 78 is determined, the time of passage of member or members 40 is determinable by controller 64 as a function of values D1 and D2, and additionally values such as the length of section NH and distance D3 (FIG. 1) if applicable, as representative examples. Additionally, if two characteristics of signal 84 and their time of occurrence are known, a speed of movement of harvester 10 can be estimated using the extent of range 82 and the probable locations in that range of the occurrences, as can be envisioned from the two depictions of tag 80 in relation to the left upper device 78 in FIG. 5. Still further, if a rear device 78 is provided, resumption of normal operation of harvesting apparatus 24 can occur when that device detects the previously detected RFID tag 80 and that occurrence is communicated to controller 64.

As noted above, RFID signal 84 can contain information that can be obtained from interrogation, which can include for instance, information as to the extent, e.g., time and/or distance that the harvesting operation is to be altered or interrupted. As a non-limiting example, for a condition such as downed or damaged plants, or a particular section of plants not to be harvested, e.g., section NH in FIG. 1, the time and/or distance of the necessary or desired interruption of harvesting operation can be relatively long, and this information, e.g., the length of section NH can be stored in the associated RFID tag and contained in emitted signal 84. As another contemplated variant, the information contained in the signal may include location information for the associated object or condition if not immediately adjacent to the RFID tag, e.g., distance D3 associated with section NH can be stored in the associated RFID tag (here, tag 80 illustrated just forward of, and about to be detected by, harvester 10). As still another variant, the existence of section NH can be identified by an RFID tag located at an alternative location AL such as, but not limited to, a trellis wire 72 or plant, at the end of section NH as illustrated in FIG. 1. Still further, the RFID tag can include information relating to plants associated therewith, e.g., variety, condition, maturity, etc., that may be desired to be stored, which can occur automatically as indicated by block 100 in FIG. 7.

Thus, using the scenario illustrated in FIG. 1, when RFID system interrogates the signal emitted by RFID tag 80 in front of harvester 10, the distance D3 will be added to distance D1 to determine the time and/or distance at which the responsive action will commence, and the information indicative of the length of associated section NH will be provided and used to calculate the duration of the responsive action, and/or the RFID tag 80 at the opposite end of section NH will be interrogated to determine that the responsive action is to cease. As another scenario, if harvester 10 is to approach section NH from the opposite direction, the associated RFID tag 80 can include information as to the length of the section, or the responsive action can continue until the next associated RFID tag is detected and interrogated.

Once the time for passage of the detected tag 80, or an associated object or condition, is determined, controller 64 can optionally determine whether the shaker member or members 40 will be flexed during the passage, as denoted by decision block 102. This is more pertinent to shorter durations of passage such as for posts 70 or the like, but it is a desired step that can be used to avoid interrupting operation of harvesting apparatus 24 unnecessarily. If the shaker members are not flexed (therefore not likely to exert undesired forces during passage), no responsive action is required and controller 64 loops back to block 92. If they will be flexed, responsive action is automatically taken, e.g., relaxation of the shaker members 40, as denoted by block 104.

Responsive actions can comprise, for instance, altering the connection of drive 38 to shaker members 40, e.g., disengaging or slipping of clutch 62, to allow shaker members 40 on opposite sides of passage 28 to move to semi-flexed or relaxed states, such as illustrated in FIG. 4, sufficiently spaced apart to allow passage of an object such as a post 70, or a condition, therebetween, with minimal contact therewith, and without the normal forceable contact, as would otherwise occur without the disengagement or slippage of the clutch. With disengagement of clutch 62, momentum of shaker members 40 can be dissipated, such that contact with a rigid or dense object or condition can push the shaker members away from the center of the passage, for passage of the object or condition therebetween.

Alternatively, drive 38 can be operated, such as by reversing or increasing speed, idling, e.g., destroking the fluid motor, or the like, to allow shaker members 40 to compliantly move to a position such as shown in FIG. 4, at the appropriate time for passage about the associated object or condition, with minimal forces exerted thereagainst, minimal interruption, or reduction of harvest yields, and minimal plant damage. As still another alternative, sides of straddling frame 12 and/or harvesting apparatus 24 can be constructed so as to be capable of temporarily spreading apart, to allow freer passage of a rigid or large object or condition such as a post therethrough.

As explained above, it should be noted that the distance from device or devices 78 to the region of maximum flexure will be known, and thus the time for passage of an object to and through the region or distance D2 can be determined by controller 64, such that control of drive 38 in the above described manner for reducing forces exerted against the object or condition will be executed at the appropriate time. The positions of shaker members 40 in their oscillating motions can also be sensed or determined, such as by use of a suitable position sensor, switch, counter, or the like, so that amplitude and forces of the motions can be reduced by clutch slippage, or other timed action taken.

Turning to decision block 106 of FIG. 7, it is determined whether shaker members 40 have passed the associated object or condition. Again, this can be calculated based on elapsed time and distance, etc., as explained above, or detected using a rear device 78, and controller 64 will loop through the steps of blocks 102-106 until it has occurred. Once passage has occurred, controller 64 will return to block 92, as indicated.

In light of all the foregoing, it should thus be apparent to those skilled in the art that there has been shown and described a harvester and method using an RFID system for detecting and locating objects and conditions along a harvesting path. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A harvester for agricultural products, comprising:
a movable frame and harvesting apparatus connected to the movable frame and configured to move with the movable frame along agricultural products bearing plants, the harvesting apparatus including at least one movable member, and a drive controllably operable and configured to drivingly move the at least one member to exert forces against the agricultural products bearing plants to release at least some of the agricultural products therefrom;
an RFID system including a first device carried on or adjacent to a leading end of the frame relative to a direction of travel and a second device carried on or adjacent to a trailing end of the frame relative to the direction of travel, wherein the first device is configured to automatically detect a signal emitted by an RFID tag present within an RFID detecting range of the first device in a manner to determine a first presence and location of an object or condition associated with the RFID tag relative to the at least one movable member of the harvesting apparatus, the second device is configured to automatically detect the signal emitted by the RFID tag present within an RFID detecting range of the second device in a manner to determine a second presence and location of the object or condition associated with the RFID tag, the RFID system is connected to a controller operatively connected to the drive, the controller is configured to automatically control the drive in response to the determined first presence and location of the object or condition associated with the RFID tag to reduce or interrupt movement of the at least one member while the at least one member is positioned to contact the object or condition, and the controller is configured to automatically control the drive in response to the determined second presence and location of the object or condition associated with the RFID tag to increase or resume the movement of the at least one member.

2. The harvester of claim 1, wherein the movement comprises an oscillating movement.

3. The harvester of claim 2, wherein reducing the movement comprises reducing an amplitude of the oscillating movement, and increasing the movement comprises increasing the amplitude of the oscillating movement.

4. The harvester of claim 1, wherein the RFID system is configured to interrogate the emitted signal to determine information contained therein to identify the first presence, the second presence, or a combination thereof, of the associated object or condition.

5. The harvester of claim 1, wherein the RFID system is configured to detect at least two characteristics of the emitted signal to determine the first location, the second location, or a combination thereof, of the associated object or condition.

6. The harvester of claim 5, wherein the at least two characteristics are indicative of moving toward the RFID tag and moving away from the RFID tag, respectively.

7. The harvester of claim 5, wherein the RFID system or the controller is configured to time stamp detection of the at least two characteristics, respectively, to determine when the at least one member will be positioned to contact the object or condition.

8. The harvester of claim 7, wherein the RFID system is configured to automatically interrogate the emitted signal to determine the first location, the second location, or a combination thereof, of the object or condition relative to the associated RFID tag.

9. The harvester of claim 1, wherein the RFID system is configured to automatically interrogate the emitted signal to obtain information sufficient to determine a duration of the reduction or interruption in the movement of the at least one member.

10. The harvester of claim 1, wherein the signal includes information relating to the condition of at least one agricultural products bearing plant associated with the RFID tag.

11. The harvester of claim 1, wherein the RFID system and the controller are configured to cooperate to automatically determine a time to execute the reduction or interruption in the movement as a function of the signal at two or more times.

12. The harvester of claim 1, wherein the RFID detecting range of the first device is about 25 cm or less, the RFID detecting range of the second device is about 25 cm or less, or a combination thereof.

13. The harvester of claim 1, wherein at least one of the first device and the second device of the RFID system is configured to generate an electromagnetic field only within about the RFID detecting range of the respective device to energize the RFID tag only when within about the RFID detecting range of the respective device.

14. The harvester of claim 1, wherein the RFID tag is self-energized to emit the signal.

15. A harvesting system for agricultural products having a RFID capability for detecting objects and conditions along a path of movement of the harvester while harvesting, comprising:
a frame configured for movement along the path;
harvesting apparatus connected to the frame for movement therewith along the path while straddling at least one agricultural products bearing plant on the path, the harvesting apparatus including at least one shaker member and a drive configured and operable to forcibly move the at least one shaker member against the at least one products bearing plant when straddled by the harvesting apparatus for releasing at least some of the agricultural products therefrom;
an RFID system including a first device carried on or adjacent to a leading end of the frame relative to a direction of travel and a second device carried on or adjacent to a trailing end of the frame relative to the direction of travel, wherein the first device is configured to automatically detect and interrogate a signal emitted by an RFID tag present along the path in relation to an associated object or condition along the path to determine a first presence and location of the object or condition, and the second device is configured to automatically detect and interrogate the signal emitted by the RFID tag present along the path in relation to the associated object or condition along the path to determine a second presence and location of the object or condition; and
a controller connected to the RFID system and the drive, wherein the controller is configured to automatically control the drive in response to the determined first presence of the object or condition to reduce or interrupt the forcible movements of the at least one shaker member while the object or condition is straddled by the harvesting apparatus, and the controller is configured to automatically control the drive in response to the determined second presence of the object or condition to increase or resume the forcible movements of the at least one shaker member while the object or condition is straddled by the harvesting apparatus.

16. The harvesting system of claim 15, wherein the RFID system is configured to generate an electromagnetic field within a range at a location that moves along the path with the frame in relation to the harvesting apparatus, wherein the RFID system is configured to energize the RFID tag present in the range in advance of passage of the harvesting apparatus about the RFID tag to induce the energized tag to emit the signal.

17. The harvesting system of claim 15, wherein the RFID system is configured to detect at least two characteristics of the emitted signal to determine the location of the associated object or condition.

18. The harvester of claim 17, wherein the at least two characteristics comprise a characteristic indicative of an increase in a strength of the signal, and a decrease in the strength, respectively.

19. The harvesting system of claim 17, wherein the RFID system or the controller is configured to time stamp detection of the at least two characteristics, respectively, to determine the location of the RFID tag.

20. The harvesting system of claim 15, wherein the RFID system is configured to automatically interrogate the emitted signal to determine a duration of the reduction or interruption of the forcible movements of the at least one shaker member.

* * * * *